Feb. 11, 1964     E. WILLIAMS     3,120,768
GUN DRILL ASSEMBLY
Filed July 10, 1962
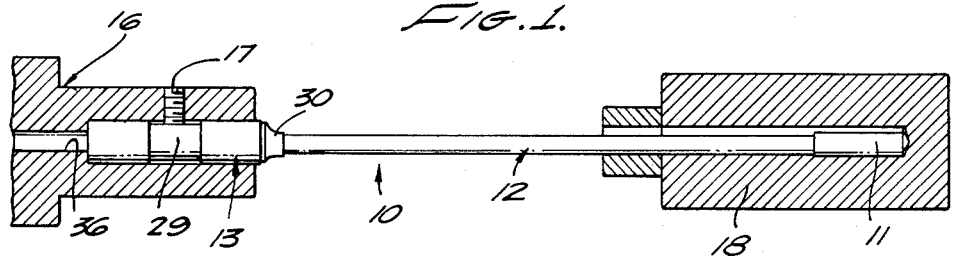
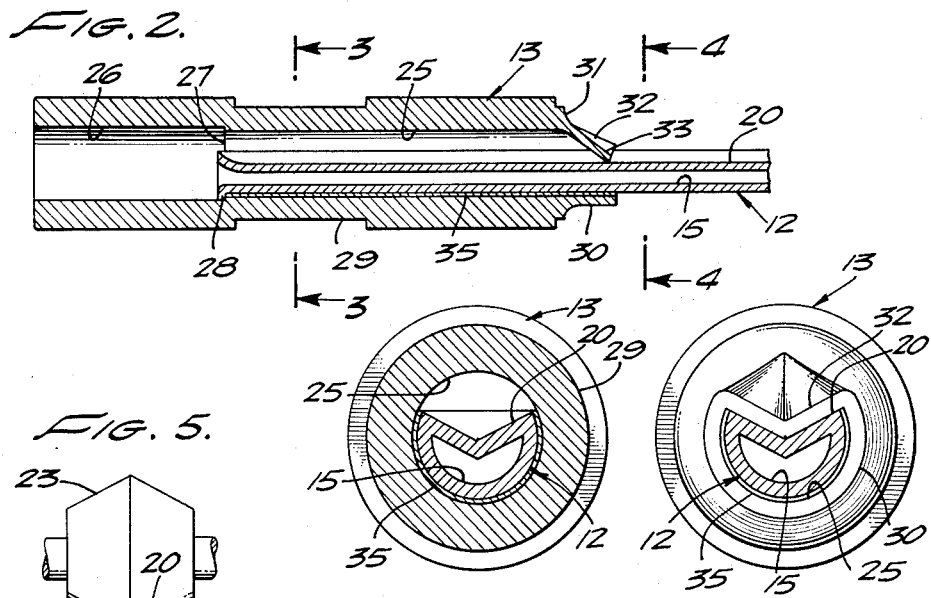
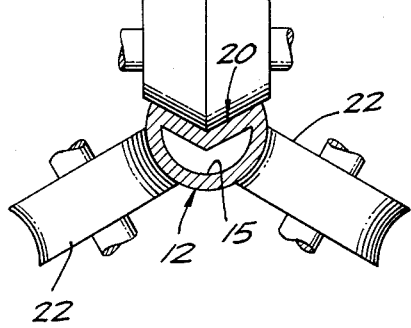
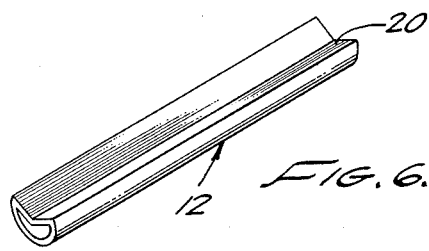
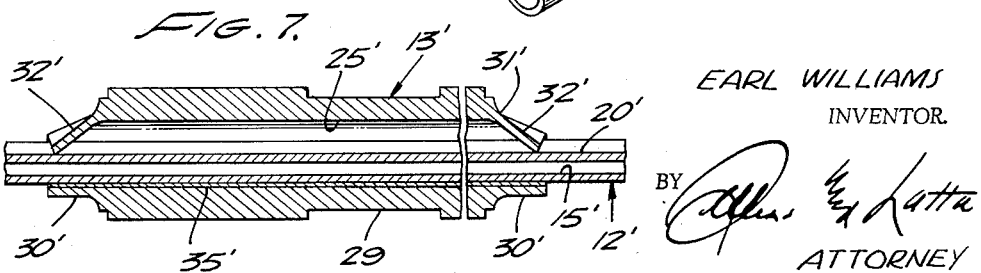
EARL WILLIAMS
INVENTOR.
BY *[signature]*
ATTORNEY United States Patent Office 3,120,768
Patented Feb. 11, 1964

3,120,768
GUN DRILL ASSEMBLY
Earl Williams, 1214 Burbank Blvd., Burbank, Calif.
Filed July 10, 1962, Ser. No. 208,861
3 Claims. (Cl. 77—71)

This invention relates to gun drills and more particularly to an improved gun drill assembly and to a method of fabricating the same and featuring a construction adapted to be disassembled and reassembled with the same parts or different parts.

Gun drills have long been made from three or more principal components including a fluted tubular shank, a cutting tip mounted in one end of the shank and a driver telescoped over and secured to the other end of the shank. Such drills are subject to the serious disadvantage that each shank must be individually processed and is suitable for use only in a given length. If the drill shank becomes bent or damaged in use it is not possible to salvage the drill as by cutting off the undamaged cutting tip length of the drill shank and remounting the serviceable portion of the shank in the driver thereby rendering the repaired shorter drill suitable for use. Furthermore the cost of processing one common type of drill shank is unnecessarily high because each particular length of drill shank must be individually formed to include a fluted portion as well as a cylindrical portion for assembly into the drill driver.

In attempts to overcome the foregoing and other disadvantages of drill shanks it has been proposed to use a continuously fluted shank and to plug the portion of the flute inserted within the driver. This plug must be secured in place between the driver and the shank and this involves the problem of securing the plug in place without risk of plugging the driver bore since this bore is employed to conduct coolant fluid to the cutting tip through the hollow shank of the drill.

By the present invention there is provided an improved gun drill assembly and a simple and efficient method of fabricating the same. The construction is not only much stronger, more durable and reliable, but provides a simple and positive mode of anchoring any selected length of continuously fluted shank to the driver without risk of plugging or interfering with the free flow of coolant along the interior of the driver and of the drill shank, and in particular permits the components to be disassembled and reassembled with the same or a shorter length of the drill shank. The shank is formed with a continuous V-shaped flute from end to end thereof thereby permitting any desired length of shank to be cut for mounting in the driver.

A further feature of the invention is the provision of a driver having either a single or a dual deformable skirt portion at the opposite ends of its bore and formed from a ductile metal readily deformable into the shank flute to block fluid flow therethrough. This expedient avoids the need for constructing a specially shaped plug for the flute or providing means for securing this plug in its assembled position. The shank features a long close-fitting bearing contact with the internal bore of the driver and is preferably intimately bonded thereto by a heat fusible bonding material thereby enabling the parts to be disassembled while heated to the fusing temperature of the bonding material and reassembled with either new or repaired components.

Accordingly it is a primary object of this invention to provide an improved gun drill assembly and a method of fabricating the same and exhibiting important advantages over prior gun drill constructions and manufacturing techniques.

Another object of the invention is the provision of a gun drill assembly embodying a continuously fluted shank and a mounting driver therefor adapted to be assembled and disassembled and featuring a driver having at least one integral skirt adapted to be deformed into the flute to form a seal as well as mechanical interlock therewith.

Another object of the invention is the provision of a simplified inexpensive gun drill assembly having a driver provided with a coolant flow passage in unrestricted communication with the interior passage of the drill shank.

These and other more specific objects will appear upon reading the following specification and claims and upon considering in connection therewith the attached drawings to which they relate.

Referring now to the drawings in which preferred embodiments of the invention are illustrated.

FIGURE 1 is a side view of a gun drill embodying the features of this invention and shown in use with portions in cross-section to show details of the operating environment;

FIGURE 2 is a fragmentary longitudinal sectional view on an enlarged scale of the driver end of the drill;

FIGURES 3 and 4 are cross-sectional views on an enlarged scale taken along lines 3—3 and 4—4 respectively on FIGURE 2;

FIGURE 5 is a generally schematic view showing one of the manufacturing steps for the drill shank;

FIGURE 6 is a perspective view of a continuous length of the fluted tubing; and

FIGURE 7 is a fragmentary view corresponding to FIGURE 2 but showing an alternate embodiment of the invention.

Referring more particularly to FIGURES 1 to 6, there is shown one preferred embodiment of a gun drill designated generally 10 incorporating the features of the present invention. This drill includes three principal components comprising a cutting tip 11 of suitable material such as tungsten carbide, a tubular shank 12, and a tubular driver 13. Although the details of cutting tip 11 are not shown, it will be understood that this tip is preferably slightly larger in diameter than shank 12 and is provided with a suitable port through its end communicating with the interior passage 15 of the shank to the end that coolant and cutting fluid may be delivered to the surfaces undergoing boring. Inasmuch as the cutting tip per se forms no part of the present invention and may be of any suitable design and material well known to those skilled in this art, it will be unnecessary to elaborate on its constructional details other than to say that it is brazed, welded or otherwise secured to the end of shank 12.

As shown in FIGURE 1, driver 13 of gun drill 10 is secured in a rotating driving spindle 16 of a drilling machine or of a boring lathe not shown, driver 13 being suitably chucked or locked in place in spindle 16 as by a set screw 17. It will be understood that the workpiece 18 undergoing boring is suitably supported and clamped opposite the cutting tip 11 of the drill.

Shank 12 is formed from continuous steel tubing of the desired diameter and is provided with a continuous flute 20 of V-shape in cross-section by passing the tubing through suitable forming rolls. It will be understood that these rolls may be shaped and arranged as shown in FIGURE 5, there customarily being several sets of these rolls arranged at spaced intervals lengthwise of the tube and each adjusted to depress one face of the tube side wall progressively toward the final shape desired as the tube is passed therealong through first one set and then another. Each set of forming rolls includes a pair of similar rolls 22, 22 supported along the lateral lower faces of tube 12 and each having a concave periphery directly supporting tube 12. Arranged above and between rolls 22, 22 is a third or forming roller 23 having a conically shaped periphery arranged to be adjusted vertically and functioning to depress the underlying wall of tube 12 as the tube is pulled lengthwise of itself between the described rollers. If desired, the tube may be passed between the same set of rollers several times with the upper roller 23 being adjusted downwardly by a slight amount for each successive passing of the tube.

Mounting driver 13 for the gun drill assembly comprises a tubular length of a strong but ductile metal provided with an internal bore 25 having a diameter corresponding to the exterior diameter of the shank to be mounted therein. According to the embodiment shown in FIGURE 2, bore 25 includes an enlarged portion 26 at its outer end having a narrow radial shoulder 27 inwardly of its end against which the inner end 28 of shank 12 can be flared and firmly seated.

The mid-exterior portion of driver 13 is relieved to provide a shallow groove 29 which may be flattened along a portion of its bottom to provide a stronger and more positive interlock with the inner end of a set screw 17 carried by spindle 16.

An important feature of the driver is the provision of a thin-walled skirt 30 integral with and projecting axially from its end. The interior surface of skirt 30 is coextensive with bore 25 and the inner or base end of the skirt preferably merges with the main body of the driver along a bell-shaped flaring surface 31 to strengthen the junction of the skirt with the driver proper. Owing to the relatively thin-walled nature of skirt 30 and the fact that it comprises ductile material, portion 32 of this skirt located directly opposite flute 20 of the drill shank is readily bent and deformed into fluid-tight engagement with the juxtaposed surfaces of flute 20. This deforming operation is preferably performed using a blunted chisel applied against the outer rim edge 33 of skirt 30 with the chisel body inclined to the right of a vertical position as viewed in FIGURE 2. While so held, the chisel is struck a sharp blow effective to fold or bend the skirt inwardly into firm contact with flute 20 as is made clear in FIGURES 2 and 4.

The assembly of the described gun drill is carried out by cutting a length of continuously fluted tubing 12 to the length required for a particular drill. One end of the shank may be deformed to provide the seating flange 28 following which the other end of the shank is inserted into driver 13 from the left hand end thereof as viewed in FIGURE 2. During the assembly of these parts, suitable heat fusible bonding material 35, such as solder or a brazing compound, is applied to the surfaces to provide a high strength mechanical connection between shank 12 and driver 13. Desirably this bonding material is also applied between the contacting rim portions of skirt 32 and the surfaces of flute 20 adjacent thereto. The bond is formed by applying heat to the parts to fuse the bonding material 35 while the parts are held in their fully assembled position as shown in FIGURE 2. Before skirt 30 is bonded to flute 20, portion 32 is deformed inwardly as by use of the technique referred to above. The driver end having been assembled, cutting tip 11 is welded, brazed or otherwise secured to the outer end of shank 12.

The finished gun drill has an unrestricted free flow passage between enlarged portion 26 of bore 25 and the internal passage 15 of the shank, the coolant fluid being supplied to the outer end of the driver by way of a passage 36 formed in driving spindle 16. Although this coolant fluid completely fills bore 25 it is prevented from escaping along flute 20 by reason of the seal provided by deformed portion 32 of skirt 30.

Should the drill become bent or damaged in use, as not infrequently happens, the shank may be readily disassembled from driver 13 by heating bonding material 35 to fusing temperature and then axially withdrawing the heated parts from one another. Prior to removal, a suitably shaped tool may be inserted from the left-hand end of bore 25 and driven against the inwardly bent portion 32 of the skirt to return it substantially to its original cylindrical condition. After the parts have been disassembled, the damaged portion of the shank is cut away and the undamaged portion is reassembled within the driver following the same technique described above thereby providing a repaired drill of shorter length. Alternatively, a new shank of any length may be inserted in the old driver thereby avoiding the need for a new driver.

Referring now to a second preferred embodiment of the gun drill shown in FIGURE 7 and wherein the same or similar parts are designated by the same reference characters distinguished by the application of a prime thereto, it will be noted that the basic difference resides in the use of a deformable thin-walled skirt 30' at both ends of driver 13'. Additionally the driver has a bore 25' of uniform length from end to end including skirts 30', 30'. Also the coolant inlet end of shank 12' terminates substantially flush with the outer rim of the adjacent skirt 30' or slightly outwardly thereof.

In all other respects the FIGURE 7 construction is the same as that shown in FIGURES 1 to 6 and described in detail above. The assembly is carried out in substantially the same manner but the strength of the resulting assembly is appreciably greater owing to the greater length of bonding material 35' in contact between the driver and shank, as well as in the fact that a double mechanical lock is provided by the two deformed portions 32', 32' of the double skirts. Also in this construction, the coolant fluid never contacts the bore 25' but is confined to flow through passage 15' of shank 12'.

While the particular gun drill assembly and method of fabricating same herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

I claim:

1. An improved gun drill shank and driver coupling comprising, an elongated tubular shank having a generally V-shaped flute extending lengthwise from end-to-end of one exterior side thereof, a thick-walled tubular driver formed in one piece having an open-ended axial bore sized to fit over the end of said shank, said driver having an integral cylindrical skirt projecting axially from one end thereof and deformed on one side to form a fluid-tight fit against the juxtaposed surfaces of said V-shaped flute thereby blocking flow of coolant fluid therepast and interlocking with said shank to prevent relative rotation of said driver and shank, a layer of bonding material sandwiched between the juxtaposed wall surfaces of said shank and the bore of said driver, said gun drill coupling being characterized in that said driver is provided with a deformable cylindrical skirt integral with each end thereof and in that said drill shank extends through both of said skirts with the flute thereof interlocked with inwardly deformed portions of both skirts.

2. A gun drill coupling as defined in claim 1 characterized in that said driver skirt is ductile and adapted to be straightened and deformed several times against drill shanks and in that said bonding material is heat fusible whereby the same driver can be assembled and disassembled several times with respect to the same or different drill shanks.

3. A gun drill assembly comprising a tubular shank having a flute extending therealong and having the same cross-sectional shape from end-to-end thereof, a tubular driver telescoped over one end of said shank having a bore provided with an annular shoulder spaced inwardly from one end thereof, the other end of said driver having a thin-walled tubular extension the interior surface of which is co-extensive with the adjacent interior surface of said bore, said extension being deformed into said flute and forming a fluid tight seal with the juxtaposed surfaces of said flute, the interior end of said shank terminating opposite said annular shoulder and being expanded outwardly into seating engagement with said shoulder, and heat fusible bonding material between the juxtaposed surfaces of said driver bore and of said shank and effective to hold the same detachably assembled.

References Cited in the file of this patent
UNITED STATES PATENTS

| | | |
|---|---|---|
| 1,144,088 | Ains | June 22, 1915 |
| 2,986,960 | Oxford et al. | June 6, 1961 |